(12) United States Patent
Zhou

(10) Patent No.: US 12,126,954 B2
(45) Date of Patent: Oct. 22, 2024

(54) METHOD AND APPARATUS FOR CONTROLLING HEADPHONES, HEADPHONES AND STORAGE MEDIUM

(71) Applicants: BEIJING XIAOMI MOBILE SOFTWARE CO., LTD., Beijing (CN); BEIJING XIAOMI PINECONE ELECTRONICS CO., LTD., Beijing (CN)

(72) Inventor: Lingsong Zhou, Beijing (CN)

(73) Assignees: Beijing Xiaomi Mobile Software Co., Ltd., Beijing (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 168 days.

(21) Appl. No.: 17/876,286

(22) Filed: Jul. 28, 2022

(65) Prior Publication Data

US 2023/0300511 A1 Sep. 21, 2023

(30) Foreign Application Priority Data

Mar. 16, 2022 (CN) .......................... 202210257479.1

(51) Int. Cl.
*H04R 1/10* (2006.01)
*G01S 15/88* (2006.01)

(52) U.S. Cl.
CPC .......... *H04R 1/1041* (2013.01); *G01S 15/88* (2013.01); *H04R 1/1016* (2013.01); *H04R 2460/13* (2013.01)

(58) Field of Classification Search
CPC ................ H04R 1/1041; H04R 1/1016; H04R 2460/13; H04R 2201/103; H04R 2430/00; H04R 2460/15; H04R 3/00; G01S 15/88
See application file for complete search history.

(56) References Cited

U.S. PATENT DOCUMENTS 10,219,063 B1 * 2/2019 Valenzuela .......... H04R 25/554
11,683,643 B2 * 6/2023 Goldstein .............. H04R 25/02
381/66

(Continued)

FOREIGN PATENT DOCUMENTS

WO 2019199706 A1 10/2019

OTHER PUBLICATIONS

The Extended European Search Report issued on Application No. 22187757.4, dated on May 23, 2023, (9p).

*Primary Examiner* — Oyesola C Ojo
(74) *Attorney, Agent, or Firm* — Arch & Lake LLP

(57) ABSTRACT

A method for controlling headphones. The headphones include a feedback microphone and a speaker. The method includes: obtaining an ear canal audio signal by collecting an audio signal in an ear canal by the feedback microphone; obtaining an audio signal feature parameter by conducting feature extraction on the ear canal audio signal; determining a tightness level of the headphones in a current wearing status; generating an audio feature to be identified according to the audio signal feature parameter and the tightness level; inputting the audio feature to be identified into a preset interactive operation identification model, and outputting an identification result, where the identification result includes an interactive operation identifier; determining a control instruction corresponding to the interactive operation identifier; and controlling a playback status of the speaker according to the control instruction.

20 Claims, 5 Drawing Sheets

(56) References Cited

U.S. PATENT DOCUMENTS

| | | | | |
|---|---|---|---|---|
| 11,729,542 B2* | 8/2023 | Carlile | ............... | H04R 1/1016 |
| | | | | 381/74 |
| 2008/0187163 A1* | 8/2008 | Goldstein | ............. | G16H 20/10 |
| | | | | 381/56 |
| 2011/0116643 A1* | 5/2011 | Tiscareno | ............. | H04R 5/033 |
| | | | | 381/380 |
| 2011/0293105 A1* | 12/2011 | Arie | ................... | H04R 1/1083 |
| | | | | 381/151 |
| 2013/0156202 A1* | 6/2013 | Hamacher | ............. | H04R 25/43 |
| | | | | 381/23.1 |
| 2017/0214994 A1* | 7/2017 | Gadonniex | ........... | H04R 1/105 |
| 2018/0113673 A1* | 4/2018 | Sheynblat | .............. | G10L 17/00 |
| 2019/0313196 A1* | 10/2019 | Usher | ................ | H04R 25/505 |

* cited by examiner

METHOD AND APPARATUS FOR CONTROLLING HEADPHONES, HEADPHONES AND STORAGE MEDIUM

CROSS REFERENCES TO RELATED APPLICATION

The present application claims priority to Chinese Application No. 202210257479.1, filed on Mar. 16, 2022, the entire disclosure of which is incorporated herein by reference for all purposes.

BACKGROUND

As a vital audio playing device in daily life, headphones can play music and various audio. When it is inconvenient or impossible to play all kinds of audio or videos by playing devices, headphones can be connected to the audio/video playing devices, that is, the headphones can play the corresponding audio.

There are many kinds of headphones with different functions and operation modes. Different interactive operation modes can bring different user experiences.

SUMMARY

The present disclosure provides a method for controlling headphones, headphones, and a storage medium.

A first aspect of the present disclosure provides headphones, include: a feedback microphone for obtaining an ear canal audio signal by collecting an audio signal in an ear canal, and sending the ear canal audio signal to a processor; where the ear canal audio signal comprises: an audio signal generated by transmitting vibration generated by an interactive operation to the ear canal through bone conduction when the headphones are worn by a user and the user conducts the interactive operation in a target area of a head of the user; the processor is configured to perform the following processing after receiving the ear canal audio signal sent by the feedback microphone: obtaining an audio signal feature parameter by conducting feature extraction on the ear canal audio signal; determining a tightness level of the headphones in a current wearing status; generating an audio feature to be identified according to the audio signal feature parameter and the tightness level; inputting the audio feature to be identified into a preset interactive operation identification model, and outputting an identification result, where the identification result comprises an interactive operation identifier; determining a control instruction corresponding to the interactive operation identifier; and controlling a playback status of the headphones according to the control instruction.

A second aspect of the present disclosure provides a method for controlling headphones, the method include: obtaining an ear canal audio signal by collecting an audio signal in an ear canal by the feedback microphone, where the ear canal audio signal include: an audio signal generated by transmitting vibration generated by an interactive operation to the ear canal through bone conduction when the headphones are worn by a user and the user conducts the interactive operation in a target area of a head of the user; performing the following processing by the processor after receiving the ear canal audio signal sent by the feedback microphone: obtaining an audio signal feature parameter by conducting feature extraction on the ear canal audio signal; determining a tightness level of the headphones in a current wearing status; generating an audio feature to be identified according to the audio signal feature parameter and the tightness level; inputting the audio feature to be identified into a preset interactive operation identification model, and outputting an identification result, where the identification result comprises an interactive operation identifier; determining a control instruction corresponding to the interactive operation identifier; and controlling a playback status of the headphones according to the control instruction.

A third aspect of the present disclosure provides a non-temporary computer-readable storage medium. The computer-readable storage medium stores a computer executable instruction. The computer executable instruction implements the method for controlling headphones when being executed by a processor, where the headphones include a feedback microphone, and the method includes: obtaining an ear canal audio signal by collecting an audio signal in an ear canal by the feedback microphone, where the ear canal audio signal includes: an audio signal generated by transmitting vibration generated by an interactive operation to the ear canal through bone conduction when the headphones are worn by a user and the user conducts the interactive operation in a target area of a head of the user; obtaining an audio signal feature parameter by conducting feature extraction on the ear canal audio signal; determining a tightness level of the headphones in a current wearing status; generating an audio feature to be identified according to the audio signal feature parameter and the tightness level; inputting the audio feature to be identified into a preset interactive operation identification model, and outputting an identification result, where the identification result includes an interactive operation identifier; determining a control instruction corresponding to the interactive operation identifier; and controlling a playback status of the headphones according to the control instruction.

It should be understood that the above general description and the following detailed description are only illustrative and explanatory, and cannot limit the present disclosure.

BRIEF DESCRIPTION OF THE DRAWINGS

The accompanying drawings herein, which are incorporated in the description as a constituent part of the description, illustrate embodiments satisfying the present disclosure and are used to explain the principles of the present disclosure together with the description.

DETAILED DESCRIPTION

Figure 1:
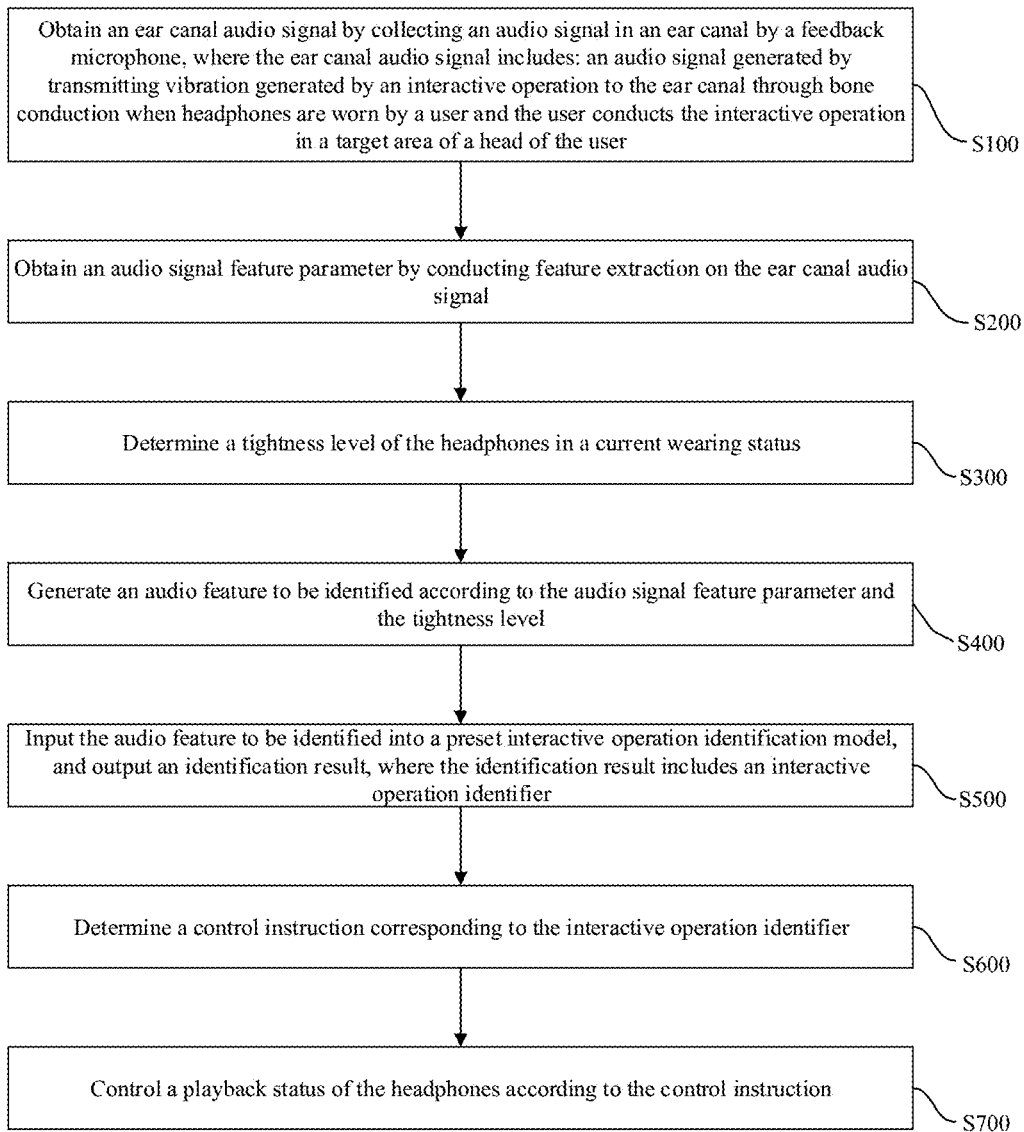
FIG. 1 is a flow schematic diagram of a method for controlling headphones according one or more examples of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The development of technology makes functions of headphones increasing. For example, true wireless stereo (TWS) headphones have various interactive functions. For example, when wearing Bluetooth headphones, a user requires a variety of interactive modes, such as sliding up and down on a headphone handle to adjust volume. With small cavities of the headphones and many interactive requirements of the user, interactive methods of more dimensions are required to provide more natural interactive experiences.

In normal cases, an interactive function of the headphones is usually achieved by sensors. The headphone handle is provided with a pressure sensor. Operations such as clicking or sliding on a sensor have pressure of different modes. Through pressure analysis, the headphones may identify operation behaviors of the user, so as to make corresponding functional response.

Because the user cannot see the headphones worn on ears, fingers of the user cannot act on the sensor accurately, resulting in some operation difficulty. In addition, additional sensors require new hardware costs.

The present disclosure relates to the technical field of control, and in particular to a method and an apparatus for controlling headphones, headphones, and a storage medium.

FIG. 1 is a schematic flowchart of a method for controlling headphones provided in the technical solution of the present disclosure. The headphones include a feedback microphone. The method includes:

S100, an audio signal in an ear canal is collected by the feedback microphone, so as to obtain an ear canal audio signal, where the ear canal audio signal includes: an audio signal generated by transmitting vibration generated by an interactive operation to the ear canal through bone conduction when the headphones are worn by a user and the user conducts the interactive operation in a target area of a head of the user.

S200, feature extraction is conducted on the ear canal audio signal, so as to obtain an audio signal feature parameter.

S300, a tightness level of the headphones in a current wearing status is determined.

S400, an audio feature to be identified is generated according to the audio signal feature parameter and the tightness level.

S500, the audio feature to be identified is input into a preset interactive operation identification model, and an identification result is output, where the identification result includes an interactive operation identifier.

S600, a control instruction corresponding to the interactive operation identifier is determined.

S700, a playback status of the headphones is controlled according to the control instruction.

In some examples, the step S100 is performed by the feedback microphone, and steps S200 to S700 are performed by the processor.

The headphones may be in different shapes, including in-ear, semi-in-ear, and head-mounted headphones.

The feedback microphone in the headphones may be located near a sound channel of the headphones. When the headphones are worn, the feedback microphone is located in the ear canal and capable of collecting the audio signal in the ear canal, with in-ear headphones as an example. When the headphones are other types of headphones, such as semi-in-ear headphones and head-mounted headphones, the feedback microphone may collect the audio signal in the ear canal when the headphones are worn.

For S100, when the headphones are worn, the ear canal is occluded to a certain extent so as to achieve a certain occlusion effect. This is because some sound may be transmitted to internal ears via human bones, such as the audio signal generated by transmitting the vibration generated by the interactive operation to the ear canal through the bone conduction when the user conducts the interactive operation in the target area of the head. When the headphones are not worn, part of sound transmitted through the bone conduction also spreads outward via external ears. When the headphones are worn, the ear canal where the sound spreads outward is occluded to a certain extent, reducing an outward spreading amount of the sound transmitted through the bone conduction via the ear canal and achieving a certain occlusion effect. A sound characteristic generated by the occlusion effect is characterized by low frequency strengthening and high frequency weakening.

The headphones occlude the ear canal to some extent, so as to achieve the occlusion effect to different extents. After the occlusion effect is generated, the headphones prevent an external audio signal from entering the ear canal, reducing influence of the external audio signal on the audio signal in the ear canal. The feedback microphone may collect the audio signal in the ear canal, so as to obtain the ear canal audio signal. The ear canal audio signal includes the audio signal generated by transmitting the vibration generated by the interactive operation to the ear canal through the bone conduction when the headphones are worn by the user and the user conducts the interactive operation in the target area of the head. The target area may be the head, a face, a neck and other areas of the user. The interactive operations may include touching and tapping, may be single touch and single tapping, or may be continuous touching and continuous tapping. The interactive operation may also be an operation acting on the headphones in the wearing status. The vibration generated by the interactive operation may also be transmitted to the ear canal through the bone conduction, so as to generate the audio signal.

After a certain occlusion effect is achieved, the vibration generated by the interactive operation may be transmitted to the ear canal through the bone conduction of the face, the head, etc., resulting in an audio signal in a first frequency range, such as an audio signal of 100 Hz to 1,000 Hz. The occlusion effect may amplify the audio signal in the first frequency range, such that the feedback microphone may conveniently collect the ear canal audio signal. The feedback microphone may directly collect the audio signal in the first frequency range as the ear canal audio signal, or may collect an amplified audio signal of first frequency as the ear canal audio signal.

For S200, after the ear canal audio signal is obtained, the feature extraction may be conducted on the ear canal audio signal, so as to obtain the audio signal feature parameter. The feature extraction may be conducted in a plurality of modes, such as extracting corresponding features by means of a feature extraction algorithm. The obtained audio signal feature parameter may be a Mel spectrum coefficient, a Mel frequency cepstrum coefficient (MFCC), etc. Both the Mel spectrum coefficient and the Mel frequency cepstrum coefficient may be feature parameters of 40 dimensions. In some examples, the audio signal feature parameter may also be other features of the ear canal audio signal.

For S300, when the headphones are worn, the tightness level of the headphones in the current wearing status may be determined by the feedback microphone, and a specific determination process is not limited herein. For example, the feedback microphone may collect an audio signal emitted by a speaker of the headphones, and may determine the tightness level of the headphones in the current wearing status on the basis of the audio signal that is emitted by the speaker and collected by the feedback microphone. Different wearing status may correspond to different tightness levels.

In an embodiment, different tightness levels may correspond to different gaps between the headphones and the ear canal. A large gap indicates a low tightness level, and a small gap indicates a high tightness level. A high tightness level indicates that the headphones are worn tightly, and a low tightness level indicates that the headphones are worn loosely. In some examples, a low tightness level may also indicate that the headphones are worn tightly, and a high tightness level may also indicate that the headphones are worn loosely. A relation between the tightness level and wearing tightness of the headphones may be determined according to actual use requirements.

In an embodiment, the tightness level may be classified according to the actual use requirements, such as Level I, Level II . . . Level V, etc. A high level may indicate a high tightness level or a low tightness level, which may be determined according to actual requirements.

In some examples, the tightness level of headphones in the current wearing status may also be determined according to the feedback microphone in other modes. The embodiment is only one of the modes. All the modes of determining the tightness level according to the feedback microphone fall within the protection scope.

In an embodiment, there is no necessary sequential relation between S300 and S100, and there is no necessary sequential relation between S300 and S200. S100 and S200 may be executed, followed by S300, or S300 may be executed, followed by S100 and S200. S300 has a coordinating relation with S100 and S200.

For S400, after the tightness level and the audio signal feature parameter are determined, the audio feature to be identified may be generated according to the tightness level and an audio signal parameter. For example, the tightness level and the audio signal parameter may be jointly taken as the audio feature to be identified. The audio feature to be identified includes information of two dimensions, namely the tightness level and the audio signal parameter, and is configured to determine the interactive operation identifier corresponding to the interactive operation.

According to different tightness levels and audio signal feature parameters, obtained audio features to be identified are different. When at least one of the tightness level and the audio signal feature parameter changes, the audio feature to be identified changes. In this way, the situation that the obtained audio feature to be identified does not change when the tightness level and the audio signal feature parameter change at the same time may be reduced, so as to improve accuracy of the identification result.

For S500, after the audio feature to be identified is generated, the interactive operation identifier may be determined according to the audio feature to be identified. There is a correspondence between the interactive operation identifier and the interactive operation. After the interactive operation identifier is determined, the corresponding interactive operation may be determined according to the interactive operation identifier. The interactive operation identifier may represent the corresponding interactive operation. For example, one interactive operation identifier corresponds to one interactive operation. There is a one-to-one correspondence between the interactive operation identifier and the interactive operation.

For example, by means of the interactive operation identification model, the audio feature to be identified may input into the interactive operation identification model, and the interactive operation identification model may output the identification result. The identification result includes the interactive operation identifier. The interactive operation identifier corresponds the interactive operation. The interactive operation identification model is a model that is trained in advance according to the interactive operation identifier and the audio feature to be identified.

In some examples, the interactive operation identifier may also be determined in other modes, such as a mapping table. The mapping table includes a mapping relation between the audio feature to be identified and the interactive operation identifier. With the mapping table looked up, the interactive operation identifier corresponding to the interactive operation acting on the target area may be determined according to the audio feature to be identified.

For example, the tightness is Level II, the audio signal feature parameter is M, and the audio feature to be identified obtained according to the tightness of Level II and the audio signal feature parameter of M is input into an interactive operation model, or the mapping table is looked up. In this way, the identification result of the interactive operation identifier indicating that the interactive operation is clicking on the face may be determined.

According to different tightness levels and different target audio signals, determined interactive operation identifiers acting on the target area are different.

For S600, after the interactive operation identifier is determined, the corresponding control instruction may be determined according to the interactive operation identifier, and then the playback status of the headphones is controlled according to the control instruction. There is a preset correspondence between the interactive operation identifier and the control instruction. After the interactive operation identifier is determined, the control instruction corresponding to the interactive operation identifier may be determined according to the preset correspondence between the interactive operation identifier and the control instruction.

Different interactive operations correspond to different interactive operation identifiers. Different interactive operation identifiers correspond to different control instructions. Different control instructions may control the headphones in different modes.

For example, an interactive operation identifier X1 corresponds to a control instruction Y1. The interactive operation identifier X1 is an identifier of an operation of single-click on a face area. An interactive operation identifier X2 corresponds to a control instruction Y2. The interactive operation identifier X2 is an identifier of an operation of double-click on the face. An interactive operation identifier X3 corresponds to a control instruction Y3. The interactive operation identifier X3 is an identifier of an operation of touching the face.

In an embodiment, there is a preset correspondence between the interactive operation identifier and the control instruction, which may be in the form of a relation table. The control instruction may be determined by looking up the table.

For S700, after the control instruction is determined, the playback status of the headphones is controlled according to the control instruction. For example, if the control instruction is the control instruction Y1 and a corresponding control operation is to increase volume, the volume of the headphones may be increased according to the control instruction Y1. If the control instruction is the control instruction Y2 and a corresponding control operation is to decrease volume, the volume of the headphones may be decreased according to the control instruction Y2. If the control instruction is the control instruction Y3 and a corresponding control operation is to pause, playback of the headphones may be paused according to the control instruction Y3.

The embodiments of the present disclosure may be applied to the headphones, the headphones have the feedback microphone, the audio signal in the ear canal is collected by the feedback microphone, so as to obtain the ear canal audio signal, and the ear canal audio signal includes the audio signal generated by transmitting the vibration generated by the interactive operation to the ear canal through the bone conduction when the headphones are worn by the user and the user conducts the interactive operation in the target area of the head. Then, the feature extraction is conducted on the ear canal audio signal, so as to obtain the audio signal feature parameter. The tightness level of the headphones in the current wearing status is obtained, the audio feature to be identified obtained according to the audio signal feature parameter and the tightness level is input into the preset interactive operation identification model, and the identification result is output. The identification result includes the interactive operation identifier. Then, the playback status of the headphones is controlled according to the determined control instruction corresponding to the interactive operation identifier.

In the solution, the ear canal audio signal is collected by the feedback microphone, and feature extraction or other analysis is conducted on the ear canal audio signal, so as to identify the interactive operation of the user. In this way, the headphones are controlled to make corresponding functional response. With an existing built-in microphone, no new hardware cost is required. It is unnecessary to mount a pressure sensor or other operation sensors in the headphones to detect operations of the user. An internal space of the headphones is reduced. Cost of the headphones is saved. A size of the headphones is decreased. In this way, a mounting space is provided for other components. In addition, a high operation difficulty problem caused by the fact that the user cannot accurately touch a sensor for detecting operations of the user in the headphones is reduced. Operation difficulty of the user is lowered. A probability of misoperation and invalid operation is reduced. The user may control the headphones by operating in a target area of the limbs, such as areas acting on the head and the face or an area of the headphones in a wearing status. A larger operation space is provided. More interactive modes are provided. In this way, user experiences are improved.

Figure 2:
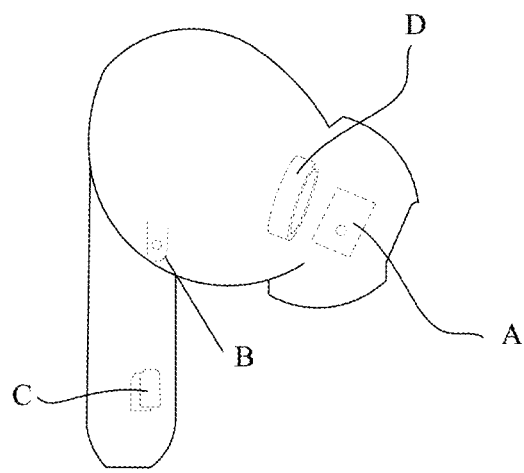
FIG. 2 is a schematic diagram of headphones according to one or more examples of the present disclosure.

FIG. 2 is a schematic diagram of headphones. The headphones include a feedback microphone A. When the headphones are worn, the feedback microphone A may be located in the ear canal. The headphones further include a feedforward microphone B. The feedforward microphone B may be located on the headphone handle. When the headphones are worn, the feedforward microphone is located outside the ear canal and capable of collecting an ambient audio signal of an external environment. The headphones may further include a call microphone C, which collects audio signals emitted by the user in a call status. A signal-to-noise ratio of the audio signal collected by the feedback microphone A is higher than that of the feedforward microphone B, so the ear canal audio signal with less noise and higher quality is collected by the feedback microphone A.

As head-mounted headphones, the headphones may also have a certain occlusion effect. When the headphones are worn, the feedback microphone A may be located outside the ear canal or face the ear canal, and is capable of collecting the ear canal audio signal.

Figure 3:
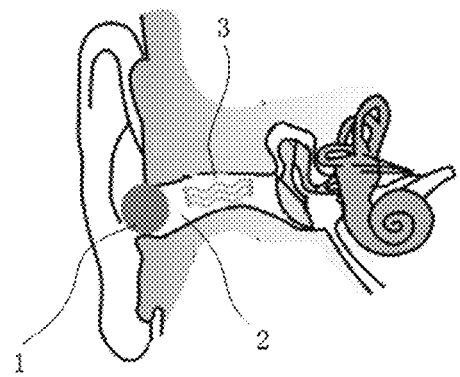
FIG. 3 is a schematic diagram of headphones in a wearing status according to one or more examples of the present disclosure.

FIG. 3 is a schematic diagram when the headphones are worn. The headphones 1 occlude the ear canal 2 to a certain extent, resulting in the occlusion effect. The ear canal audio signal collected by the feedback microphone includes: an audio signal generated by transmitting vibration generated by interactive operations such as touching or clicking the face or head of the user to the ear canal through bone conduction, that is, an audio signal 3.

Figure 4:
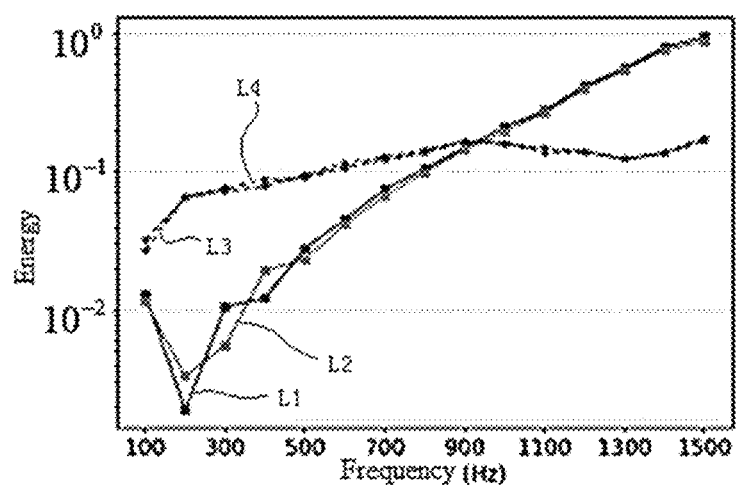
FIG. 4 is a schematic diagram of an occlusion effect to amplify an ear canal audio signal in an ear canal according to one or more examples of the present disclosure.

FIG. 4 is a schematic diagram of the occlusion effect to amplify the ear canal audio signal in the ear canal. L1 is an energy curve graph of transmitting the vibration generated by the interactive operation to the ear canal through the bone conduction without the occlusion effect so as to generate the audio signal. L3 is an energy curve graph of L1 under the occlusion effect. L2 is another energy curve graph of transmitting the vibration generated by the interactive operation to the ear canal through the bone conduction without the occlusion effect so as to generate the audio signal. L4 is an energy curve graph of L2 under the occlusion effect. Obviously, in a range of about 100 Hz to 1,000 Hz, the occlusion effect obviously amplifies energy of the same audio signal. Frequency of the audio signal generated by transmitting the vibration generated by the interactive operation to the ear canal through the bone conduction is usually within the frequency range.

In an embodiment, after a certain occlusion effect is achieved, there may further be a noise signal other than the audio signal generated by transmitting the vibration generated by the interactive operation to the ear canal through the bone conduction when the headphones are worn by the user and the user conducts the interactive operation in the target area of the head in the ear canal. That is, the ear canal audio signal may further include an audio signal other than the audio signal generated by transmitting vibration generated by interactive operations to the ear canal through the bone conduction.

After the feedback microphone collects the ear canal audio signal, the ear canal audio signal may be filtered by the processor, and the audio signal other than the audio signal generated by transmitting vibration generated by interactive operations to the ear canal through the bone conduction is filtered, so as to obtain a filtered ear canal audio signal. Then, the feature extraction is conducted on the filtered ear canal audio signal, so as to obtain the audio signal feature parameter.

With filtering operations conducted on the ear canal audio signal, influence of the audio signal other than the audio signal generated by transmitting vibration generated by interactive operations to the ear canal through the bone conduction on the audio signal generated by transmitting vibration generated by interactive operations to the ear canal through the bone conduction may be reduced. Influence of the audio signal other than the audio signal generated by transmitting vibration generated by interactive operations to the ear canal through the bone conduction on the identification result may be reduced. In this way, a signal-to-noise ratio of the ear canal audio signal is improved, accuracy of the identification result is further improved, the control instruction is more accurately determined according to the identification result, improving accuracy of controlling the headphones.

In an embodiment, when the tightness level of the headphones in the current wearing status is determined, the tightness level of the headphones may be determined by the processor at predetermined intervals. At predetermined intervals, the tightness of the headphones in the current wearing status is measured by the processor, so as to obtain the tightness level of the headphones. After the tightness level of the headphones is obtained, the currently obtained tightness level of the headphones may further be stored.

The tightness of the headphones in the current wearing status is measured once at predetermined intervals, such that the tightness level of the headphones in the current wearing status may be updated. According to an updated tightness level, the identification result may be more accurately determined.

In another embodiment, the headphones are further provided with the speaker for outputting the audio signal. For example, the speaker may be located near the sound channel of the headphones. When the headphones are worn, the audio signal emitted by the speaker may be transmitted to the ear canal. FIG. 2 shows headphones. The headphones include a speaker D.

Figure 5:
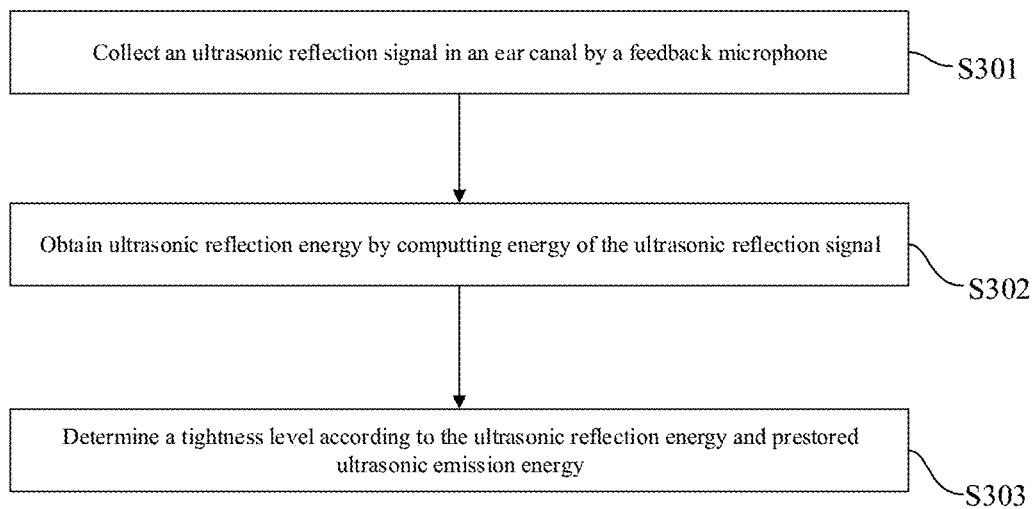
FIG. 5 is a schematic diagram of determining a tightness level according to one or more examples of the present disclosure.

FIG. 5 is a schematic diagram of determining the tightness level. S300, a tightness level of the headphones in a current wearing status is determined includes:

S301, an ultrasonic reflection signal in the ear canal is collected by the feedback microphone, where the ultrasonic reflection signal is an audio signal obtained after an ultrasonic wave signal is reflected by the ear canal when being transmitted in the ear canal, and the ultrasonic wave signal is emitted by the speaker according to predetermined frequency.

S302, energy of the ultrasonic reflection signal is computed, so as to obtain ultrasonic reflection energy.

S303, the tightness level is obtained according to the ultrasonic reflection energy and prestored ultrasonic emission energy.

In some examples, the step S301 is performed by the feedback microphone, and steps S302 to S303 are performed by the processor.

When the tightness level of the headphones in the current wearing status is determined, the ultrasonic wave signal is output from the speaker, and the ultrasonic wave signal is transmitted in the ear canal. The ear canal may reflect the ultrasonic wave signal. The feedback microphone may collect the audio signal obtained after the ultrasonic wave signal is transmitted in the ear canal and then is reflected by the ear canal, that is, the ultrasonic reflection signal. In the embodiment, the ultrasonic reflection signal collected by the feedback microphone is different from an ultrasonic signal output from the speaker.

In an embodiment, the speaker may emit the ultrasonic wave signal according to the predetermined frequency.

The ultrasonic signal is different from the ultrasonic reflection signal. When the headphones are at different tightness levels, ultrasonic reflection signals are also different. According to a difference between the ultrasonic signal and the ultrasonic reflection signal, the tightness level of the headphones may be determined.

For example, the higher a tightness level, the smaller a gap between the headphones and the ear canal may be, the less the amount of ultrasonic wave signals transmitted out of the ear canal, and the less a difference between the ultrasonic wave signal and the ultrasonic reflection signal. The lower a tightness level, the larger a gap between the headphones and the ear canal, the greater the amount of ultrasonic wave signals transmitted out of the ear canal, and the greater a difference between the ultrasonic wave signal and the ultrasonic reflection signal. The higher a tightness level, the better an occlusion effect, and the higher a decibel of the audio signal generated by transmitting the vibration generated by the interactive operation to the ear canal through the bone conduction. In this way, the feedback microphone may more easily collect the audio signal generated by transmitting the vibration generated by the interactive operation to the ear canal through the bone conduction, and signal strength of the ear canal audio signal collected by the feedback microphone may be greater.

A difference between the ultrasonic wave signal and the ultrasonic reflection signal and the tightness level may be determined according to a preset correspondence. The preset correspondence may be determined according to the actual requirements. The difference between the ultrasonic wave signal and the ultrasonic reflection signal is not limited to specific differences, as long as the tightness level may be determined according to two audio signals. The difference may be a difference between energy or other aspects.

In the embodiment, after the feedback microphone collects the ultrasonic reflection signal, the energy of the ultrasonic reflection signal may be computed by the processor, so as to obtain the ultrasonic reflection energy. The ultrasonic emission energy for the speaker to emit the ultrasonic wave signal may be prestored, for example, may be prestored in a processor in the headphones or determined when the speaker emits the ultrasonic wave signal. A process of determining the ultrasonic emission energy and the ultrasonic reflection energy is not limited in the embodiment, and may refer to the following embodiments.

The tightness level of the headphones may be determined by the processor according to the ultrasonic reflection energy and the ultrasonic emission energy for the speaker to emit the ultrasonic wave signal. For example, the tightness level is determined according to an energy difference between the ultrasonic reflection energy and the ultrasonic emission energy.

The ultrasonic wave signal is emitted by the speaker. When the tightness level of the headphones is determined according to the ultrasonic wave signal and the ultrasonic reflection signal, the user cannot hear the ultrasonic wave signal because human ears are not very sensitive to ultrasonic wave signals. Therefore, when the tightness level is determined by means of the ultrasonic wave signal, normal use of the user cannot be influenced, and auditory interference to the user cannot be generated. The tightness level of the headphones may be determined without user perception. Influence on the user is reduced. The user experiences are improved.

In another embodiment, frequency of the ultrasonic wave signal is different from that of the ear canal audio signal, such that mutual influence between the ultrasonic wave signal and the ear canal audio signal may be reduced when the tightness level is determined and the ear canal audio signal is collected. The frequency of the ultrasonic wave signal may be consistent with that of the ultrasonic reflection signal. When the tightness level is determined, the ultrasonic reflection signal may be filtered by the processor, so as to filter out other audio signals without the frequency of the ultrasonic reflection signal. In this way, influence of other audio signals on collection of the ultrasonic reflection signal may be reduced, influence on determination of the tightness level of the headphones may be further reduced, and accuracy of determining the tightness level of the headphones may be improved.

In another embodiment, the step that energy of the ultrasonic reflection signal is computed by the processor, so as to obtain ultrasonic reflection energy includes:

The ultrasonic reflection energy is obtained by the processor according to energy of at least one sampling point in at least one signal frame in the ultrasonic reflection signal. The ultrasonic emission energy is obtained by the processor according to energy of at least one sampling point in at least one signal frame in the ultrasonic wave signal.

In an embodiment, energy of a certain signal frame of the ultrasonic wave signal and the ultrasonic reflection signal may be determined through Formula (1):

$$E = 20\log10\sum_{i=1}^{L} k_i \quad (1)$$

L indicates a frame length, and $k_i$ indicates energy of an ith sampling point in the signal frame. There are L sampling points in the frame length L. L may be determined according to actual requirements, and $k_i$ may be determined after collection. The ultrasonic signal output from the speaker may be collected by a device with an audio signal collection function in the headphones. The ultrasonic reflection signal may be collected by the feedback microphone. After collection, the signal may be transmitted to a corresponding processing device, such as a controller, so as to determine $k_i$.

Energy of a signal frame of the ultrasonic wave signal may be determined through Formula (2):

$$E_1 = 20\log10\sum_{i=1}^{L} x_i \quad (2)$$

$x_i$ indicates energy of an ith sampling point in a certain signal frame of the ultrasonic wave signal.

Energy of a signal frame of the ultrasonic reflection signal may be determined through Formula (3):

$$E_2 = 20\log10\sum_{i=1}^{L} y_i \quad (3)$$

$y_i$ indicates energy of an ith sampling point in a certain signal frame of the ultrasonic reflection signal.

In another embodiment, the ultrasonic emission energy may be prestored or may not be determined through Formula (2).

In another embodiment, the tightness level may be determined by the processor according to the energy difference between the ultrasonic emission energy and the ultrasonic reflection energy. There is a preset mapping relation between the energy difference and the tightness level. After the energy difference is determined, the tightness level may be determined according to the preset mapping relation.

The energy difference may be expressed through Formula (4):

$$\Delta E = E_1 - E_2 \quad (4)$$

According to the preset mapping relation between ΔE and the tightness level, the tightness level may be determined after ΔE is determined. Table 1 is an example of the preset mapping relation provided in the embodiment.

TABLE 1

| ΔE | Tightness level |
|---|---|
| Greater than 17 dB | 1 |
| Greater than 14 dB and less than 17 dB | 2 |
| Greater than 11 dB and less than 14 dB | 3 |
| Greater than 8 dB and less than 11 dB | 4 |
| Less than 8 dB | 5 |

In Table 1, the less ΔE, the greater a number corresponding to a level, the higher the tightness level, the better an occlusion effect, and the higher a decibel of the audio signal generated by transmitting the vibration generated by the interactive operation to the ear canal through the bone conduction. In this way, the feedback microphone may more easily collect the audio signal generated by transmitting the vibration generated by the interactive operation to the ear canal through the bone conduction, and signal strength of the ear canal audio signal collected by the feedback microphone may be greater.

In another embodiment, the tightness level may be further determined by the processor according to the energy of a signal frame of the ultrasonic reflection signal and the energy of a signal frame of the ultrasonic wave signal. The tightness level may be further determined by the processor according to energy of a plurality of signal frames of the ultrasonic reflection signal and energy of a plurality of signal frames of the ultrasonic wave signal.

When the tightness level is determined according to the energy of a plurality of signal frames of the ultrasonic wave signal and the energy of a plurality of signal frames of the ultrasonic reflection signal, the tightness level may be determined according to an energy difference between average energy of a plurality of signal frames of the ultrasonic wave signal and average energy of a plurality of signal frames of the ultrasonic reflection signal.

In another embodiment, S100, an ear canal audio signal in an ear canal is collected by the feedback microphone includes:

when the ear canal audio signal collected by the feedback microphone includes the ultrasonic wave signal output from the speaker of the headphones, the ultrasonic wave signal is filtered to obtain the filtered ear canal audio signal; and/or, when the ear canal audio signal collected by the feedback microphone includes an audio signal other than the ultrasonic wave signal and the audio signal generated by transmitting the vibration generated by interactive operations to the ear canal through the bone conduction, such as audio signals of music, the ear canal audio signal is filtered, and the audio signal other than the ultrasonic wave signal and the audio signal generated by transmitting the vibration generated by interactive operations to the ear canal through the bone conduction is filtered, so as to obtain the filtered ear canal audio signal.

After a certain occlusion effect is achieved, when the ear canal audio signal is collected, the speaker of the headphones may output the ultrasonic wave signal, and/or the audio signal other than the ultrasonic wave signal and the audio signal generated by transmitting the vibration generated by interactive operations to the ear canal through the bone conduction. The audio signal other than the ultrasonic wave signal and the audio signal generated by transmitting the vibration generated by interactive operations to the ear canal through the bone conduction may be audio required by the user normally, such as audio of songs or videos. When the audio signal generated by transmitting the vibration generated by interactive operations to the ear canal through the bone conduction, the ultrasonic wave signal, and/or the audio signal other than the ultrasonic wave signal and the audio signal generated by transmitting the vibration generated by interactive operations to the ear canal through the bone conduction exist at the same time, the ultrasonic wave signal and/or the audio signal other than the ultrasonic wave signal and the audio signal generated by transmitting the vibration generated by interactive operations to the ear canal through the bone conduction may be filtered out. In this way, influence of other audio signals on the ear canal audio signal may be reduced, and accuracy of collecting the ear canal audio signal may be improved. The ear canal audio signal may be filtered by a controller of the headphones or other devices with a filtering function, for example, through an echo cancellation algorithm, etc.

In another implementation, when the tightness level of the headphones is low and there is a gap between the headphones and the ear canal, the audio signal in the external environment may also be transmitted to the ear canal. The audio signal in the external environment is recorded as the ambient audio signal. The ambient audio signal may be an audio signal in an environment where the headphones are located. In this case, the ear canal audio signal collected by the feedback microphone includes the ambient audio signal. The ear canal audio signal is filtered, and the ambient audio signal is filtered, so as to obtain the filtered ear canal audio signal. In this way, influence of the ambient audio signal on the ear canal audio signal is reduced, and the signal-to-noise ratio and the accuracy of collecting the ear canal audio signal are improved.

In another embodiment, when the headphones are worn, the feedforward microphone is located outside the ear canal. The ambient audio signal may be collected by the feedforward microphone in the headphones, with reference to B in FIG. 2.

In an embodiment, when the feedback microphone collects the ear canal audio signal, if the ear canal audio signal includes the ultrasonic signal, the ear canal audio signal may be filtered through lowpass filtering, etc.

In an embodiment, after the feedback microphone collects the ear canal audio signal, the controller in the headphones may identify whether the ear canal audio signal includes the ultrasonic wave signal, and whether the ear canal audio signal includes ambient noise, etc. in combination with the ambient noise collected by the feedforward microphone.

In another embodiment, the interactive operation identification model is obtained by training an initial neural network model by means of a training sample set through machine learning in advance. A structure of the initial neural network model is not limited. After training by means of the training sample set through the machine learning, the identification result may be output according to the audio feature to be identified.

In an embodiment, the training sample set includes a positive sample set, and the positive sample set includes a plurality of positive samples.

Each of the positive samples includes: a target interactive operation audio feature, the tightness level of the headphones and a first label.

The target interactive operation audio feature is an audio feature obtained by collecting and processing a sound signal in the ear canal by the headphones when the headphones are worn by the user and the user conducts a target operation in the target area. The first label is configured to identify the target operation and the tightness level of the headphones.

The target interactive operation audio feature may be an audio feature obtained by processing the sound signal in the ear canal collected by the feedback microphone by a processor in the headphones, etc. and conducting the feature extraction when the user conducts the target operation in the target area. The target interactive operation audio feature in each of the positive samples and the tightness level of the headphones in the current wearing status are taken as input of the initial neural network model, and the first label is taken as output of the initial neural network model. The number of positive samples in the positive sample set may be determined according to the actual requirements. The more the number, the higher accuracy of the interactive operation identification model obtained through training.

The target operation of the user in the target area may at least include: single-click, double-click, more consecutive clicks on a face area, etc.; single-click, double-click, more consecutive clicks on a head area, etc.; and single-click, double-click, more consecutive clicks on a neck area, etc. The target operation and the target area may be determined according to the actual use requirements.

The target interactive operation audio feature may include a Mel spectrum feature coefficient, a Mel frequency cepstrum feature coefficient, etc. Both the Mel spectrum coefficient and the Mel frequency cepstrum coefficient may be coefficients of 40 dimensions. In different positive samples, tightness levels of the headphones in a wearing status are different, and/or target interactive operation audio features are different.

In another embodiment, the training sample set further includes a negative sample set, and the negative sample set includes a plurality of negative samples.

Each of the negative samples includes: a non-target interactive operation audio feature, the tightness level of the headphones and a second label.

The non-target interactive operation audio feature is an audio feature obtained by collecting and processing a sound signal in the ear canal by the headphones when the headphones are worn by the user and the user conducts a non-target operation in the target area. The second label is configured to identify the non-target operation and the tightness level of the headphones.

The non-target interactive operation audio feature may be an audio feature obtained by processing the sound signal in the ear canal collected by the feedback microphone by a processor in the headphones, etc. and conducting the feature extraction when the user conducts the non-target operation in the target area. The non-target interactive operation audio feature in each of the negative samples and the tightness level of the headphones in the current wearing status are taken as input of the initial neural network model, and the second label is taken as output of the initial neural network model. The number of negative samples in the negative sample set may be determined according to the actual requirements. The more the number, the higher accuracy of the interactive operation identification model obtained through training.

The non-target operation of the user in the target area may at least include: single-touch, double-touch, more consecutive touches on a face area, etc.; single-touch, double-touch, more consecutive touches on a head area, etc.; single-touch, double-touch, more consecutive touches on a neck area, etc.; and single-pat, double-pat and more consecutive pats on the face area, etc. The non-target operation and the target area may be determined according to the actual use requirements.

The non-target interactive operation audio feature may include a Mel spectrum feature coefficient, a Mel frequency cepstrum feature coefficient, etc. Both the Mel spectrum coefficient and the Mel frequency cepstrum coefficient may be coefficients of 40 dimensions. In different negative samples, tightness levels of the headphones in a wearing status are different, and/or non-target interactive operation audio features are different.

The non-target operation is different from the target operation. The initial neural network model is trained with the positive sample set and the negative sample set, such that the accuracy of the obtained interactive operation identification model is higher. In this way, accuracy of the output identification result and accuracy of controlling the headphones may be improved.

With the tightness levels of the headphones in the wearing status combined, the initial neural network model is trained with the positive samples and negative samples, and the interactive operation identification model is obtained. A network model is trained with information of two dimensions of the Mel spectrum coefficient and the Mel frequency cepstrum coefficient of a target audio signal as well as information of one dimension of the tightness level of the headphones in the wearing status. In this way, identification capability of the interactive operation identification model may be improved, resulting in a more accurate obtained identification result.

Figure 6:
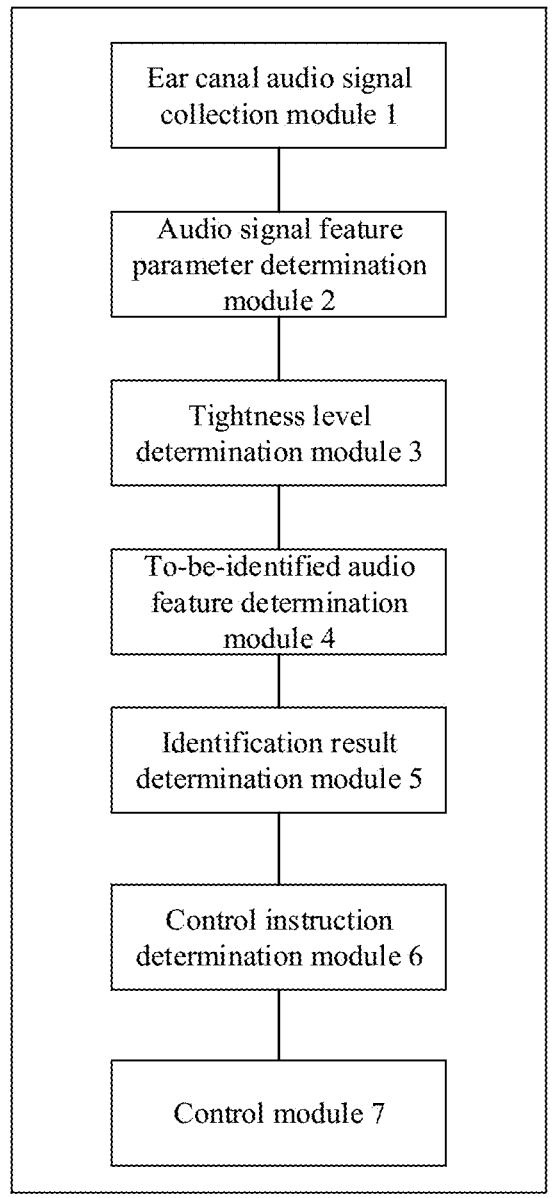
FIG. 6 is a structural schematic diagram of an apparatus for controlling headphones according to one or more examples of the present disclosure.

In another embodiment, FIG. 6 is a structural schematic diagram of an apparatus for controlling headphones. The headphones include a feedback microphone. The apparatus includes:

an ear canal audio signal collection module 1 configured to collect an audio signal in an ear canal by the feedback microphone, so as to obtain an ear canal audio signal, where the ear canal audio signal includes: an audio signal generated by transmitting vibration generated by an interactive operation to the ear canal through bone conduction when the headphones are worn by a user and the user conducts the interactive operation in a target area of a head of the user;

an audio signal feature parameter determination module 2 configured to conduct feature extraction on the ear canal audio signal, so as to obtain an audio signal feature parameter;

a tightness level determination module 3 configured to determine a tightness level of the headphones in a current wearing status;

a to-be-identified audio feature determination module 4 configured to generate an audio feature to be identified according to the audio signal feature parameter and the tightness level;

an identification result determination module 5 configured to input the audio feature to be identified into a preset interactive operation identification model, and output an identification result, where the identification result includes an interactive operation identifier;

a control instruction determination module 6 configured to determine a control instruction corresponding to the interactive operation identifier; and a control module 7 configured to control a playback status of the headphones according to the control instruction.

In another embodiment, the tightness level determination module is further configured to measure tightness of the headphones in the current wearing status at predetermined intervals, so as to obtain the tightness level and store the tightness level.

In another embodiment, the headphones include a speaker, and the tightness level determination module includes:

an ultrasonic reflection signal collection unit configured to collect an ultrasonic reflection signal in the ear canal by the feedback microphone, where the ultrasonic reflection signal is an audio signal obtained after an ultrasonic wave signal is reflected by the ear canal when being transmitted in the ear canal, and the ultrasonic wave signal is emitted by the speaker according to predetermined frequency;

an ultrasonic reflection energy determination unit configured to compute energy of the ultrasonic reflection signal, so as to obtain ultrasonic reflection energy; and a tightness level determination unit configured to obtain the tightness level according to the ultrasonic reflection energy and prestored ultrasonic emission energy.

In another embodiment, the ultrasonic reflection energy determination unit is further configured to:

obtain the ultrasonic reflection energy according to energy of at least one sampling point in at least one signal frame in the ultrasonic reflection signal.

In another embodiment, the tightness level determination unit is further configured to:

determine the tightness level according to an energy difference between the ultrasonic reflection energy and the ultrasonic emission energy, where there is a preset mapping relation between the energy difference and the tightness level.

In another embodiment, the apparatus further includes:

a first filtering module configured to filter, before computing the energy of the ultrasonic reflection signal, so as to obtain the ultrasonic reflection energy, the ultrasonic reflection signal, so as to obtain a filtered ultrasonic reflection signal.

In another embodiment, the apparatus further includes:

a second filtering module configured to conduct, before conducting the feature extraction on the ear canal audio signal, so as to obtain the audio signal feature parameter, lowpass filtering on the ear canal audio signal, so as to obtain a filtered ear canal audio signal.

In another embodiment, the interactive operation identification model is obtained by training an initial neural network model by means of a training sample set through machine learning in advance.

In another embodiment, the training sample set includes a positive sample set, and the positive sample set includes a plurality of positive samples.

Each of the positive samples includes: a target interactive operation audio feature, the tightness level and a first label.

The target interactive operation audio feature is an audio feature obtained by collecting and processing a sound signal in the ear canal by the headphones when the headphones are worn by the user and the user conducts a target operation in the target area. The first label is configured to identify the target operation and the tightness level.

In another embodiment, the training sample set further includes a negative sample set, and the negative sample set includes a plurality of negative samples.

Each of the negative samples includes: a non-target interactive operation audio feature, the tightness level and a second label.

The non-target interactive operation audio feature is an audio feature obtained by collecting and processing a sound signal in the ear canal by the headphones when the headphones are worn by the user and the user conducts a non-target operation in the target area. The second label is configured to identify the non-target operation and the tightness level.

In another embodiment, there is further provided an electronic device. The electronic device includes:

a processor and a memory configured to store an executable instruction capable of running on the processor.

When the processor is configured to run the executable instruction, the executable instruction executes the method according to any one of the embodiments.

In another embodiment, there is further provided a non-temporary computer-readable storage medium. The computer-readable storage medium stores a computer executable instruction. The computer executable instruction implements the method according to any one of the embodiments when being executed by a processor.

It should be noted that "first" and "second" in the embodiments of the present disclosure are merely for convenience of description and distinction, and have no other specific meanings.

Figure 7:
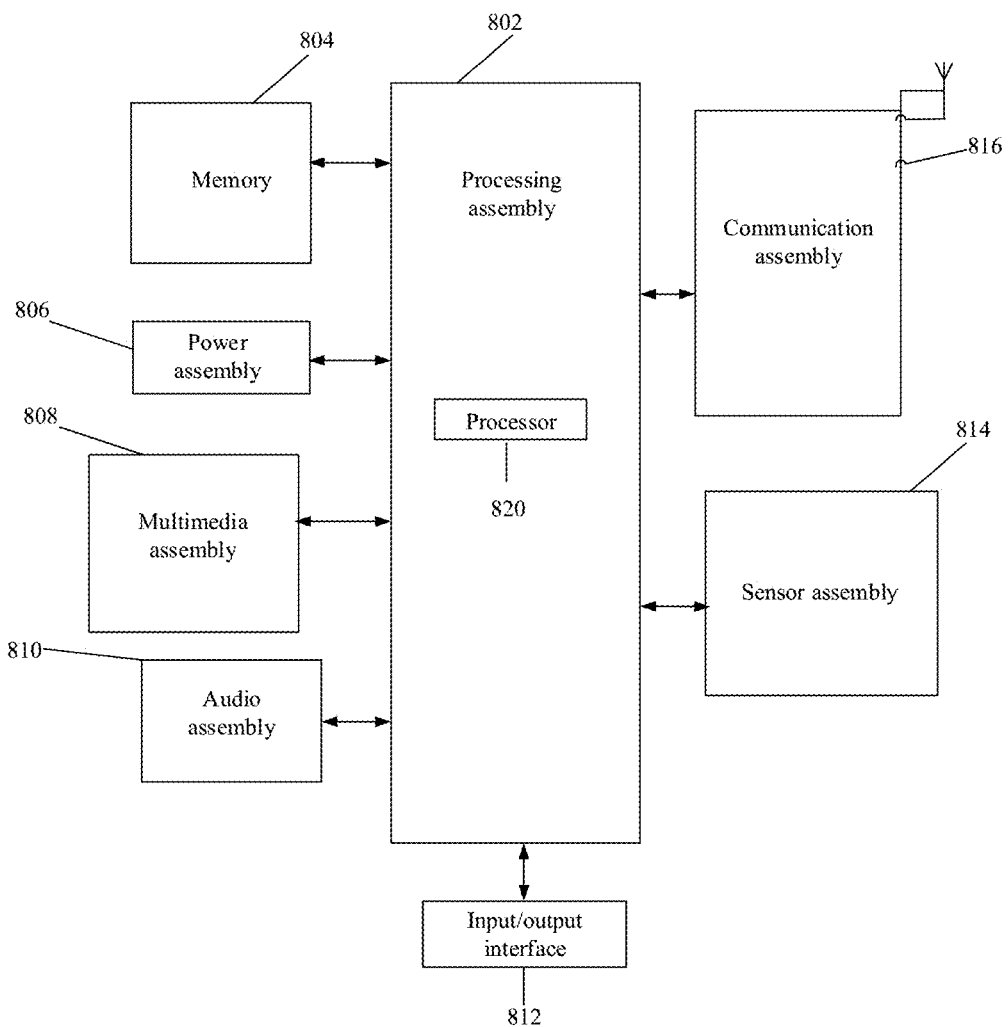
FIG. 7 is a block diagram of a terminal device according to one or more examples of the present disclosure.

FIG. 7 is a block diagram of a terminal device according to an illustrative embodiment. For example, the terminal device may be a mobile phone, a computer, a digital broadcast terminal, a messaging device, a game console, a tablet device, a medical device, a fitness device, a personal digital assistant, etc.

With reference to FIG. 7, the terminal device may include one or more of the following assemblies: a processing assembly 802, a memory 804, a power assembly 806, a multimedia assembly 808, an audio assembly 810, an input/output (I/O) interface 812, a sensor assembly 814, and a communication assembly 816.

The processing assembly 802 generally controls all operations of the terminal device, such as operations associated with display, telephone call, data communication, camera operation and recording operation. The processing assembly 802 may include one or more processors 820 to execute an instruction, so as to complete all or part of the steps of the method. In addition, the processing assembly 802 may include one or more modules to facilitate interactions between the processing assembly 802 and other assemblies. For example, the processing assembly 802 may include a multimedia module to facilitate an interaction between the multimedia assembly 808 and the processing assembly 802.

The memory 804 is configured to store various types of data to support the operations on the terminal device. Examples of the data include an instruction for any application or method operating on the terminal device, contact data, phone book data, a message, a picture, a video, etc. The memory 804 may be implemented by any type of volatile or nonvolatile memory device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The power assembly 806 supplies power to various assemblies of the terminal device. The power assembly 806 may include a power management system, one or more power supplies, and other assemblies associated with generating, managing and distributing power for the terminal device.

The multimedia assembly 808 includes a screen that provides an output interface between the terminal device and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touching, sliding and gestures on the touch panel. The touch sensor may sense a boundary of a touching or sliding operation, and further measure a duration and pressure related to the touching or sliding operation. In some embodiments, the multimedia assembly 808 includes a front camera and/or a back camera. When the terminal device is in an operation mode, such as a shooting mode or a video mode, the front camera and/or the back camera are/is capable of receiving external multimedia data. Each of the front camera and back camera may be a fixed optical lens system or have a focal length and optical zoom capability.

The audio assembly 810 is configured to output and/or input an audio signal. For example, the audio assembly 810 includes a microphone (MIC). The microphone is configured to receive an external audio signal when the terminal device is in operation modes such as a call mode, a recording mode and a voice identification mode. The received audio signal may be further stored in the memory 804 or sent via the communication assembly 816. In some embodiments, the audio assembly 810 further includes a speaker for outputting an audio signal.

The I/O interface 812 provides an interface between the processing assembly 802 and a peripheral interface module.

The peripheral interface module may be a keyboard, a click wheel, a button, etc. The buttons may include, but are not limited to, a home button, a volume button, a start button and a lock button.

The sensor assembly 814 includes one or more sensors for providing various aspects of status assessment for the terminal device. For example, the sensor assembly 814 is capable of detecting an on/off status of the terminal device and relative positioning of the assemblies such as a display and a keypad of the terminal device, and the sensor assembly 814 is further capable of detecting position change of the terminal device or an assembly of the terminal device, presence or absence of contact between the user and the terminal device, an orientation or acceleration/deceleration of the terminal device, and temperature change of the terminal device. The sensor assembly 814 may include a proximity sensor configured to detect presence of a nearby object without any physical contact. The sensor assembly 814 may further include an optical sensor, such as a complementary metal-oxide-semiconductor (CMOS) or charge-coupled device (CCD) image sensor, which is used in imaging applications. In some embodiments, the sensor assembly 814 may further include an acceleration sensor, a gyroscope sensor, a magnetic sensor, a pressure sensor or a temperature sensor.

The communication assembly 816 is configured to facilitate wired or wireless communication between the terminal device and other devices. The terminal device may access a wireless network based on a communication standard, such as WiFi, the 4th generation mobile communication technology (4G) or the 5th generation mobile communication technology (5G), or their combination. In an illustrative embodiment, the communication assembly 816 receives a broadcast signal or broadcast related information from an external broadcast management system via a broadcast channel. In an illustrative embodiment, the communication assembly 816 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology and other technologies.

In the illustrative embodiments, the terminal device may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components, executing the method.

Those skilled in the art could easily conceive of other implementation solutions of the present disclosure upon consideration of the description and the disclosure disclosed herein. The present disclosure is intended to cover any variations, uses or adaptive changes of the present disclosure, which follow the general principles of the present disclosure and include common general knowledge or conventional technical means, which is not disclosed in the present disclosure, in the art. The description and the embodiments are to be regarded as merely examples, and the true scope of the present disclosure are indicated by the following claims.

It should be understood that the present disclosure is not limited to a precise structure which has been described above and illustrated in the accompanying drawings, and may have various modifications and changes without departing from the scope. The scope of the present disclosure is limited merely by the appended claims.

A first aspect of an embodiment of the present disclosure provides a method for controlling headphones. The headphones include a feedback microphone. The method includes: obtaining an ear canal audio signal by collecting an audio signal in an ear canal by the feedback microphone, where the ear canal audio signal includes: an audio signal generated by transmitting vibration generated by an interactive operation to the ear canal through bone conduction when the headphones are worn by a user and the user conducts the interactive operation in a target area of a head of the user; obtaining an audio signal feature parameter by conducting feature extraction on the ear canal audio signal; determining a tightness level of the headphones in a current wearing status; generating an audio feature to be identified according to the audio signal feature parameter and the tightness level; inputting the audio feature to be identified into a preset interactive operation identification model, and outputting an identification result, where the identification result includes an interactive operation identifier; determining a control instruction corresponding to the interactive operation identifier; and controlling a playback status of the headphones according to the control instruction.

In an embodiment, where the method further include: obtaining the tightness level by measuring the tightness of the headphones in the current wearing status at predetermined intervals, and storing the tightness level.

In an embodiment, where the headphones include a speaker, and the obtaining the tightness level by measuring the tightness of the headphones in the current wearing status includes: collecting an ultrasonic reflection signal in the ear canal by the feedback microphone, where the ultrasonic reflection signal is an audio signal obtained after an ultrasonic wave signal is reflected by the ear canal when being transmitted in the ear canal, and the ultrasonic wave signal is emitted by the speaker according to predetermined frequency; obtaining ultrasonic reflection energy by computing energy of the ultrasonic reflection signal; and obtaining the tightness level according to the ultrasonic reflection energy and prestored ultrasonic emission energy.

In an embodiment, where the obtaining ultrasonic reflection energy by computing energy of the ultrasonic reflection signal includes: obtaining the ultrasonic reflection energy according to energy of at least one sampling point in at least one signal frame in the ultrasonic reflection signal.

In an embodiment, where the obtaining the tightness level according to the ultrasonic reflection energy and prestored ultrasonic emission energy includes: determining the tightness level according to an energy difference between the ultrasonic reflection energy and the ultrasonic emission energy, where there is a preset mapping relation between the energy difference and the tightness level.

In an embodiment, where before the obtaining ultrasonic reflection energy by computing energy of the ultrasonic reflection signal, the method further includes: obtaining a filtered ultrasonic reflection signal by filtering the ultrasonic reflection signal.

In an embodiment, where before the obtaining an audio signal feature parameter by conducting feature extraction on the ear canal audio signal, the method further includes: obtaining a filtered ear canal audio signal by conducting lowpass filtering on the ear canal audio signal.

In an embodiment, the interactive operation identification model is obtained by training an initial neural network model by means of a training sample set through machine learning in advance.

In an embodiment, the training sample set includes a positive sample set, and a positive sample set includes a plurality of positive samples; each of the positive samples includes: a target interactive operation audio feature, the tightness level and a first label; and the target interactive operation audio feature is an audio feature obtained by collecting and processing a sound signal in the ear canal by the headphones when the headphones are worn by the user and the user conducts a target operation in the target area, and the first label is configured to identify the target operation and the tightness level.

In an embodiment, the training sample set further includes a negative sample set, and a negative sample set includes a plurality of negative samples; each of the negative samples includes: a non-target interactive operation audio feature, the tightness level and a second label; and the non-target interactive operation audio feature is an audio feature obtained by collecting and processing a sound signal in the ear canal by the headphones when the headphones are worn by the user and the user conducts a non-target operation in the target area, and the second label is configured to identify the non-target operation and the tightness level.

A second aspect of an embodiment of the present disclosure provides an apparatus for controlling headphones. The headphones include a feedback microphone. The apparatus includes: an ear canal audio signal collection module configured to collect an audio signal in an ear canal by the feedback microphone, so as to obtain an ear canal audio signal, where the ear canal audio signal includes: an audio signal generated by transmitting vibration generated by an interactive operation to the ear canal through bone conduction when the headphones are worn by a user and the user conducts the interactive operation in a target area of a head of the user; an audio signal feature parameter determination module configured to conduct feature extraction on the ear canal audio signal, so as to obtain an audio signal feature parameter; a tightness level determination module configured to determine a tightness level of the headphones in a current wearing status; a to-be-identified audio feature determination module configured to generate an audio feature to be identified according to the audio signal feature parameter and the tightness level; an identification result determination module configured to input the audio feature to be identified into a preset interactive operation identification model, and output an identification result, where the identification result includes an interactive operation identifier; a control instruction determination module configured to determine a control instruction corresponding to the interactive operation identifier; and a control module configured to control a playback status of the headphones according to the control instruction.

A third aspect of an embodiment of the present disclosure provides an electronic device. The electronic device includes: a processor and a memory configured to store an executable instruction capable of running on the processor. When the processor is configured to run the executable instruction, the executable instruction executes the method according to any one of the embodiments.

A fourth aspect of an embodiment of the present disclosure provides a non-temporary computer-readable storage medium. The computer-readable storage medium stores a computer executable instruction. The computer executable instruction implements the method according to any one of the embodiments when being executed by a processor.

What is claimed is:

1. Headphones, comprising:
a feedback microphone to obtain an ear canal audio signal by collecting an audio signal in an ear canal, and to send the ear canal audio signal to a processor; wherein the ear canal audio signal comprises: an audio signal generated by transmitting vibration generated by an interactive operation to the ear canal through bone conduction when the headphones are worn by a user and the user conducts the interactive operation in a target area of a head of the user; and wherein the processor is configured to perform following processing after receiving the ear canal audio signal sent by the feedback microphone:

obtaining an audio signal feature parameter by conducting feature extraction on the ear canal audio signal;

determining a tightness level of the headphones in a current wearing status;

generating an audio feature to be identified according to the audio signal feature parameter and the tightness level;

inputting the audio feature to be identified into a preset interactive operation identification model, and outputting an identification result, wherein the identification result comprises an interactive operation identifier;

determining a control instruction corresponding to the interactive operation identifier; and controlling a playback status of the headphones according to the control instruction.

2. The headphones according to claim 1, wherein the processor is further configured to:
obtain the tightness level by measuring the tightness of the headphones in the current wearing status at predetermined intervals, and store the tightness level.

3. The headphones according to claim 2, wherein the headphones further comprise a speaker;
the speaker is configured to emit an ultrasonic wave signal according to predetermined frequency;
the feedback microphone is further configured to collect an ultrasonic reflection signal in the ear canal, and send the ultrasonic reflection signal to the processor, wherein the ultrasonic reflection signal is an audio signal obtained after an ultrasonic wave signal is reflected by the ear canal when being transmitted in the ear canal; and
the processor is further configured to obtain ultrasonic reflection energy by computing energy of the ultrasonic reflection signal, and obtain the tightness level according to the ultrasonic reflection energy and prestored ultrasonic emission energy.

4. The headphones according to claim 3, wherein the processor is further configured to:
obtain the ultrasonic reflection energy according to energy of at least one sampling point in at least one signal frame in the ultrasonic reflection signal.

5. The headphones according to claim 3, wherein the processor is further configured to:
determine the tightness level according to an energy difference between the ultrasonic reflection energy and the ultrasonic emission energy, wherein a preset mapping relation exists between the energy difference and the tightness level.

6. The headphones according to claim 3, wherein the processor is further configured to:
obtain a filtered ultrasonic reflection signal by filtering the ultrasonic reflection signal.

7. The headphones according to claim 1, wherein the processor is further configured to:
obtain a filtered ear canal audio signal by conducting lowpass filtering on the ear canal audio signal.

8. The headphones according to claim 1, wherein
the interactive operation identification model is obtained by training an initial neural network model by means of a training sample set through machine learning in advance.

9. The headphones according to claim 8, wherein the training sample set comprises a positive sample set, and the positive sample set comprises a plurality of positive samples;
each of the positive samples comprises: a target interactive operation audio feature, a tightness level and a first label; and
the target interactive operation audio feature is obtained by collecting and processing a sound signal in the ear canal by the headphones when the headphones are worn by the user and the user conducts a target operation in the target area, and the first label is configured to identify the target operation and the tightness level;
wherein the training sample set further comprises a negative sample set, and the negative sample set comprises a plurality of negative samples;
each of the negative samples comprises: a non-target interactive operation audio feature, a tightness level and a second label; and
the non-target interactive operation audio feature is obtained by collecting and processing a sound signal in the ear canal by the headphones when the headphones are worn by the user and the user conducts a non-target operation in the target area, and the second label is configured to identify the non-target operation and the tightness level.

10. A method for controlling headphones, the method comprises:
obtaining an ear canal audio signal by collecting an audio signal in an ear canal by a feedback microphone of the headphones, wherein the ear canal audio signal comprises: an audio signal generated by transmitting vibration generated by an interactive operation to the ear canal through bone conduction when the headphones are worn by a user and the user conducts the interactive operation in a target area of a head of the user;
performing following processing by a processor of the headphones after receiving the ear canal audio signal sent by the feedback microphone:
obtaining an audio signal feature parameter by conducting feature extraction on the ear canal audio signal;
determining a tightness level of the headphones in a current wearing status;
generating an audio feature to be identified according to the audio signal feature parameter and the tightness level;
inputting the audio feature to be identified into a preset interactive operation identification model, and outputting an identification result, wherein the identification result comprises an interactive operation identifier;
determining a control instruction corresponding to the interactive operation identifier; and
controlling a playback status of the headphones according to the control instruction.

11. The method according to claim 10, wherein the method further comprises:
obtaining the tightness level by the processor by measuring the tightness of the headphones in the current wearing status at predetermined intervals, and storing the tightness level.

12. The method according to claim 10, wherein the method further comprises:
emitting an ultrasonic wave signal by a speaker of the headphones according to predetermined frequency;
collecting an ultrasonic reflection signal in the ear canal by the feedback microphone, and sending the ultrasonic reflection signal to the processor, wherein the ultrasonic reflection signal is an audio signal obtained after an ultrasonic wave signal is reflected by the ear canal when being transmitted in the ear canal; and
wherein determining the tightness level of the headphones in the current wearing status comprises:
obtaining ultrasonic reflection energy by the processor by computing energy of the ultrasonic reflection signal, and determining the tightness level according to the ultrasonic reflection energy and prestored ultrasonic emission energy.

13. The method according to claim 12, wherein obtaining the ultrasonic reflection energy by the processor by computing energy of the ultrasonic reflection signal comprises:
obtaining the ultrasonic reflection energy by the processor according to energy of at least one sampling point in at least one signal frame in the ultrasonic reflection signal.

14. The method according to claim 12, wherein determining the tightness level according to the ultrasonic reflection energy and prestored ultrasonic emission energy comprises:
determining the tightness level by the processor according to an energy difference between the ultrasonic reflection energy and the ultrasonic emission energy, wherein there is a preset mapping relation between the energy difference and the tightness level.

15. The method according to claim 12, wherein before obtaining the ultrasonic reflection energy by the processor by computing energy of the ultrasonic reflection signal, the method further comprises:
obtaining a filtered ultrasonic reflection signal by the processor by filtering the ultrasonic reflection signal.

16. The method according to claim 10, wherein before obtaining the audio signal feature parameter by conducting feature extraction on the ear canal audio signal, the method further comprises:
obtaining a filtered ear canal audio signal by the processor by conducting lowpass filtering on the ear canal audio signal.

17. The method according to claim 10, wherein
the interactive operation identification model is obtained by training an initial neural network model by means of a training sample set through machine learning in advance.

18. The method according to claim 17, wherein the training sample set comprises a positive sample set, and the positive sample set comprises a plurality of positive samples;
each of the positive samples comprises: a target interactive operation audio feature, a tightness level and a first label; and
the target interactive operation audio feature is obtained by collecting and processing a sound signal in the ear canal by the headphones when the headphones are worn by the user and the user conducts a target operation in the target area, and the first label is configured to identify the target operation and the tightness level.

19. The method according to claim 17, wherein the training sample set further comprises a negative sample set, and the negative sample set comprises a plurality of negative samples;
each of the negative samples comprises: a non-target interactive operation audio feature, a tightness level and a second label; and the non-target interactive operation audio feature is obtained by collecting and processing a sound signal in the ear canal by the headphones when the headphones are worn by the user and the user conducts a non-target operation in the target area, and the second label is configured to identify the non-target operation and the tightness level.

20. A non-transitory computer-readable storage medium, storing a computer executable instruction, wherein the computer executable instruction implements a method for controlling headphones when being executed by a processor, wherein the headphones comprise a feedback microphone, and the method comprises:

obtaining an ear canal audio signal by collecting an audio signal in an ear canal by the feedback microphone, wherein the ear canal audio signal comprises: an audio signal generated by transmitting vibration generated by an interactive operation to the ear canal through bone conduction when the headphones are worn by a user and the user conducts the interactive operation in a target area of a head of the user;

obtaining an audio signal feature parameter by conducting feature extraction on the ear canal audio signal;

determining a tightness level of the headphones in a current wearing status;

generating an audio feature to be identified according to the audio signal feature parameter and the tightness level;

inputting the audio feature to be identified into a preset interactive operation identification model, and outputting an identification result, wherein the identification result comprises an interactive operation identifier;

determining a control instruction corresponding to the interactive operation identifier; and controlling a playback status of the headphones according to the control instruction.

* * * * *